US008778193B2

(12) United States Patent
Minnie et al.

(10) Patent No.: US 8,778,193 B2
(45) Date of Patent: Jul. 15, 2014

(54) FILTRATION METHOD AND INSTALLATION

(75) Inventors: Ockert Rudolph Minnie, Mossel Bay (ZA); Patrick Otto Taylor, Mossel Bay (ZA); Pål Søraker, Trondheim (NO); Marcus Fathi, Trondheim (NO)

(73) Assignees: Petroleum Oil and Gas Corporation of South Africa, Ltd. (ZA); Statoil Hydro ASA (NO)

( * ) Notice: Subject to any disclaimer, the term of this patent is extended or adjusted under 35 U.S.C. 154(b) by 1320 days.

(21) Appl. No.: 12/089,197

(22) PCT Filed: Oct. 2, 2006

(86) PCT No.: PCT/ZA2006/000113

§ 371 (c)(1),
(2), (4) Date: May 22, 2009

(87) PCT Pub. No.: WO2007/041726

PCT Pub. Date: Apr. 12, 2007

(65) Prior Publication Data

US 2009/0261046 A1 Oct. 22, 2009

Related U.S. Application Data

(60) Provisional application No. 60/740,624, filed on Nov. 28, 2005.

(30) Foreign Application Priority Data

Oct. 4, 2005 (ZA) .................................. 2005/8009
Dec. 22, 2005 (ZA) ................................ 2005/10404

(51) Int. Cl.

| | |
|---|---|
| ***B01D 29/62*** | (2006.01) |
| ***B01J 8/22*** | (2006.01) |
| ***B01J 8/00*** | (2006.01) |
| ***C10G 2/00*** | (2006.01) |

(52) U.S. Cl.
CPC .. *B01J 8/22* (2013.01); *B01J 8/006* (2013.01); *C10G 2/342* (2013.01); *B01J 8/228* (2013.01)
USPC ............ 210/798; 210/791; 210/797; 210/483

(58) Field of Classification Search
USPC .......................... 210/106–108, 791, 793–798
See application file for complete search history.

(56) References Cited

U.S. PATENT DOCUMENTS

| | | | | |
|---|---|---|---|---|
| 4,605,678 | A | 8/1986 | Brennan et al. | |
| 5,407,644 | A | 4/1995 | Rytter et al. | |
| 5,468,397 | A * | 11/1995 | Barboza et al. | 210/798 |
| 5,844,006 | A | 12/1998 | Jager et al. | |
| 2002/0027111 | A1 * | 3/2002 | Ando et al. | 210/791 |
| 2002/0128330 | A1 * | 9/2002 | Anderson | 518/722 |
| 2003/0150807 | A1 * | 8/2003 | Bartels et al. | 210/636 |
| 2007/0197667 | A1 * | 8/2007 | Vogel | 518/700 |

FOREIGN PATENT DOCUMENTS

| | | | |
|---|---|---|---|
| EP | 0 609 079 | A1 | 8/1994 |
| WO | WO00/45948 | A2 | 8/2000 |
| WO | WO03/089103 | A2 | 10/2003 |

* cited by examiner

*Primary Examiner* — Tony G Soohoo
*Assistant Examiner* — Peter Keyworth
(74) *Attorney, Agent, or Firm* — Knobbe Martens Olson & Bear, LLP.

(57) ABSTRACT

The invention provides a method for the separation of liquid from a three phase slurry bubble column. The method includes the step of charging the inside of a hollow filter element with a rinsing fluid to clean the inside of the filter for catalyst fines followed by a backflushing step. The invention also provides an installation for the separation of liquid from a three phase slurry bubble column. The installation includes at feast one hollow and enclosed filter element and one or more conduits in fluid communication with the internal volume of the filter, with at least one conduit being configured or connected for inflow of rinsing fluid and at least one conduit being configured or connection for outflow of rinsing fluid.

21 Claims, 11 Drawing Sheets

FILTRATION METHOD AND INSTALLATION

CROSS-REFERENCE TO RELATED APPLICATIONS

This application is the U.S. National Phase filing under 35 U.S.C. §371 of PCT/ZA2006/000113, filed Oct. 2, 2006, which designated the United States and was published in English, which claims priority under 35 U.S.C. §119(a)-(d) to South Africa Patent Application No. 2005/8009, filed Oct. 4, 2005, U.S. Provisional Application No. 60/740,624 filed Nov. 28, 2005, and South Africa Patent Application No. 2005/10404, filed Dec. 22, 2005. The contents of these applications are incorporated herein by reference in their entireties.

FIELD OF THE INVENTION

This invention relates to a method and installation for the separation of liquid from a slurry bubble column reactor.

BACKGROUND TO THE INVENTION

Slurry bubble column reactors are well known in the art and widely used as reactors for Low Temperature Fisher-Tropsch (LTFT) processes. LTFT processes include the step of bubbling synthesis gas, consisting mainly of carbon monoxide and hydrogen, through a column of hydrocarbon liquid wherein catalyst particles are suspended. The synthesis gas reacts in the presence of the catalyst to form predominantly liquid hydrocarbons. The liquid hydrocarbons are separated from the column, normally by filtration. The filters are preferably inside the column. The catalyst particle size distribution and filter mesh size is normally within a selected range. Typically such filters are manufactured from stainless steel woven wire mesh, sintered metal, wedge wire or ceramic filter elements. Often filter cake builds up on the outside of the filter, although this is normal and in some cases necessary for filtration; the filter cake needs to be removed when the filtration rate decreases below an acceptable level. The preferred way of removing this filter cake is periodic backflushing of the filter. However, catalyst fines may be trapped in the filter openings or collected on the filtrate side of the filter, and eventually, despite backflushing, the filtration rate may decrease below acceptable levels. Backflushing can in some instances compound the problem of decreasing filtration rates by forcing fines collected on the filtrate side of the filter back into the filter pores where the fines can get permanently trapped. It is well known that an acceptable filtration rate of liquids combined with acceptable loss of from such a LTFT column is a major engineering obstacle to be overcome for commercial success.

One solution to this problem offered in the prior art is a carefully selected catalyst particle size distribution and filter mesh size combination, as teached in WO00/45948. However, catalyst attrition occurs in a slurry bubble column reactor, and over time catalyst fines outside the selected range are formed inside the column. As a result a lot of research has focused on attrition resistant LTFT catalysts, without much success due to high flow velocities inside a slurry bubble column reactor. Another solution; teached in EP 609 079 is backflushing of the filter followed by a waiting period before filtration resumes, to allow the turbulence inside the column to break up the filter cake, and to remove the filter cake from the filter. However, catalyst fines inside the filter pores and on the filtrate side of the filter remain trapped.

It is envisaged that the invention can be applied in any method and apparatus for the separation of liquids from a three phase mixture.

SUMMARY OF THE INVENTION

According to one aspect of the invention there is provided a method for the separation of liquid from a three phase slurry bubble column, which method includes the steps of:

a) applying a filtering pressure differential across filtering media of a hollow filter element and any filter cake build-up on the outside of said filter element, to obtain and withdraw a filtrate from inside the filter element;
b) in parallel or followed by; charging the inside of the filter element with a rinsing fluid to clean the inside of the filter for catalyst fines;
c) applying a backwashing pressure differential opposite to the filtering pressure differential to force a backflushing fluid in an opposite direction across the filter media to dislodge filter cake build-up.

The steps may be repeating steps.

Step (b) will be referred to as the rinsing step and step (c) the backwashing step.

The method includes removing the rinsing fluid together with any suspended fines from the inside of the filter.

The inside of the filter should be charged with rinsing fluid when the filtration rate has reached a predetermined low level, or after a predetermined time.

The step of applying backwashing pressure should follow, after a predetermined time, the step of charging the inside of the filter with rinsing fluid.

The filter element may be a surface filter (also named two-dimensional filters), preferably a woven wire filter or slot filter, closed in both ends.

Opposite to what is teached in WO00/45948; no careful selection of catalyst particle size distribution and filter mesh size combination is necessary. The filter mesh size may be smaller, greater or similar to the average particle size of the catalyst particles in the slurry. Preferably the filter mesh size may be of the same order as the average particle size of the catalyst particles in the slurry.

The charging pressure of the rinsing fluid when charging the inside of the filter element should be lower or similar to the pressure at the outside of the filter element; in the slurry phase, to minimize transport of the said rinsing fluid across the filter element into the slurry phase.

The rinsing fluid may consist of any hydrocarbon liquid essentially free from fines particles. The rinsing fluid may preferentially consist of liquid products from the Fischer-Tropsch reaction; filtered liquid wax or condensed gaseous products.

The volume of the rinsing liquid should be selected to be similar or greater than the inside volume of the filter element.

When charging the rinsing fluid, filtrate can still flow across the filter element from the slurry phase.

The filter may be charged from the top or bottom of the filter. The filter may preferably be charged in a turbulent manner to increase the suspension of the fines in the rinsing fluid.

The removed rinsing liquid together with any fines suspended therein may be directed to a rinsing liquid vessel for further processing.

Charging the inside of the filter element with the said rinsing fluid may be repeated one or more times before the backflushing step.

The charging pressure of the backflushing fluid when charging the inside of the filter element should be higher than the pressure at the outside of the filter element, in the slurry phase, to force transport of the said backflushing fluid across the filter element into the slurry phase.

The backflushing fluid may consist of any hydrocarbon liquid. The backflushing liquid may be the same fluid as the rinsing fluid, or another fluid. The backflushing fluid may preferentially consist of liquid products from the Fischer-Tropsch reaction; filtered liquid wax or condensed gaseous products.

The backflushing fluid may also include a combination of liquid and gas. The gas may be gaseous products from the Fischer-Tropsch reaction, synthesis gas, or an inert gas, such as nitrogen. The liquid and gas combination may be charged simultaneously or sequentially.

The backflushing liquid flux should be equal to or greater than twice the average liquid filtration flux.

Opposite to what is teached in WO00/45948; no waiting period between the backflushing sequence and the filtering sequence is in general necessary. However, a waiting period before the resumption of filtration is still an option within the scope of the present invention.

The outlet for the filtrate and the rinsing fluid should preferably be located at the bottom of the filter element.

The temperature of the rinsing fluid and the backwashing fluid should be high enough to avoid condensation of water in the slurry phase in the vicinity of the filter element.

According to another aspect of the invention, there is provided an installation for the separation of liquid from a three phase slurry bubble column, which installation includes:

a) at least one hollow and enclosed filter element; and b) one or more conduits in fluid communication with the internal volume of filter, with at least one conduit being configured or connected for inflow of rinsing fluid and at least one conduit being configured or connected for outflow of rinsing fluid.

The term 'enclosed' is used in this context to describe a filter element in which there is no direct liquid communication between the slurry side and the filtrate side of the filter element except for the passage of fluids through the filter membrane itself.

The conduits may be provided with valves for preventing or allowing flow of fluids there through.

A conduit should be configured or connected for extracting filtrate.

A conduit may be configured or connected for inflow of backflushing fluid.

The installation may include a vessel for storage of rinsing liquid in fluid communication with the conduit configured or connected for outflow of rinsing fluid.

The invention also extends to a LTFT process, which process includes the method described above.

The invention also extends to a LTFT plant which includes an installation as described above.

BRIEF DESCRIPTION OF THE DRAWINGS

The invention is now described more detailed, and with reference to the accompanying drawings.

DETAILED DESCRIPTION OF THE PREFERRED EMBODIMENT

Figure 1:
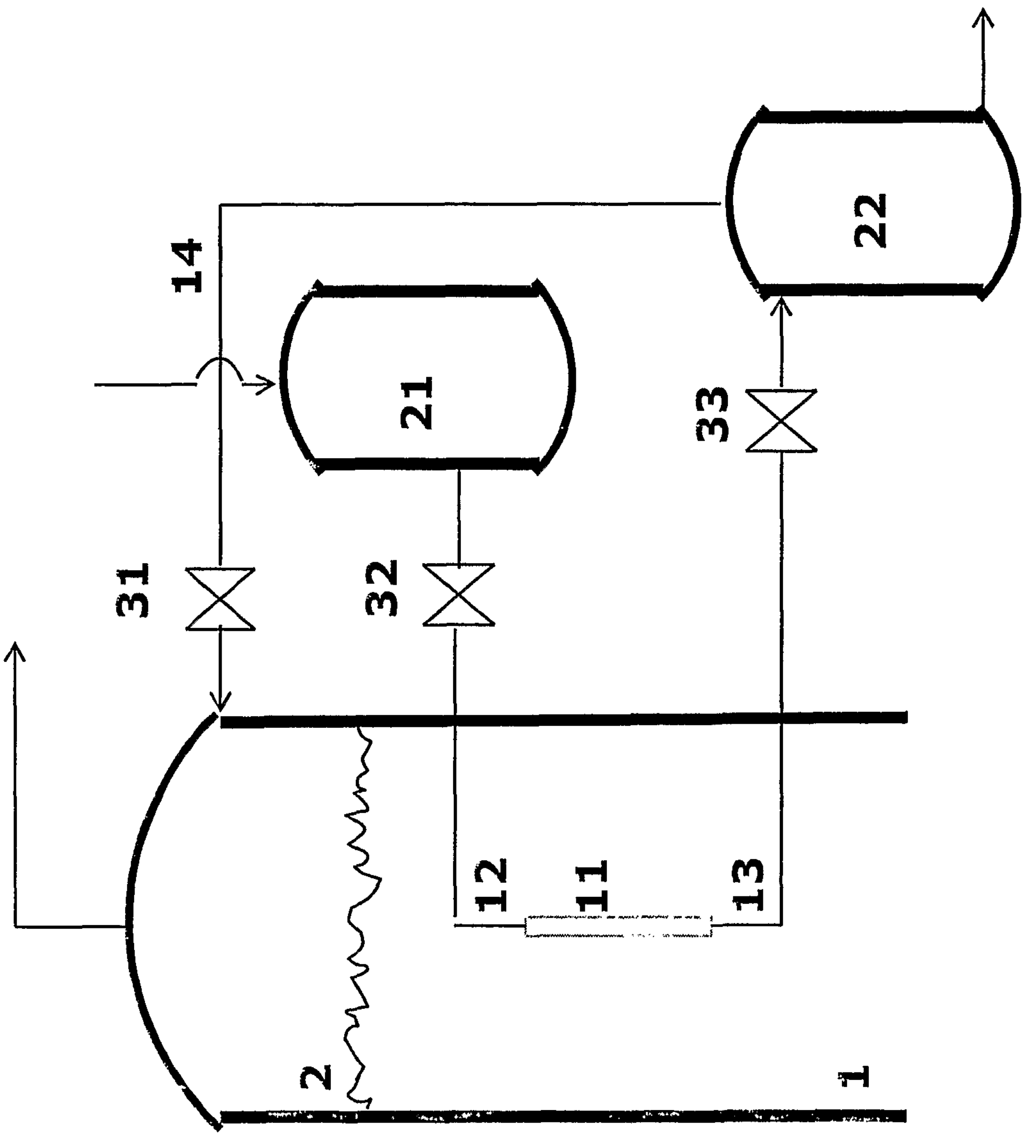
FIG. 1 shows a simplified first embodiment of an installation for the separation of liquid from a slurry bubble column reactor, in accordance with the invention.

Referring to FIG. 1; a device for separation of liquid from the slurry, in accordance with the invention, is installed in the upper section of a LTFT slurry bubble column reactor 1, below the slurry level indicated by 2. The separation device includes a plurality of hollow filter elements immersed in a vertical orientation in the slurry. For simplicity only one such filter element 11 is shown in FIG. 1. The filter element 11 is a surface filter, preferably a stainless steel woven wire filter or slot filter, closed in both ends. Preferably the filter element mesh size is in the same order as the average particle size of the catalyst particles in the slurry. A filter element inlet conduit 12 in the upper part of the filter element 11, is connecting the filter element 11 and a vessel for supplying rinsing fluid and backflushing fluid 21, and a filter element outlet conduit 13, located at the bottom of the filter element 11 is connecting the filter element 11 and a vessel for storage of filtrate and rinsing fluid 22. A gas communication conduit 14 between the upper part of the storage vessel 22 and the gas phase above the slurry level 2 in the LTFT slurry bubble column reactor 1 ensures gas communication between the storage vessel 22 and the LTFT slurry bubble column reactor 1, as further described in U.S. Pat. No. 5,407,644.

Each of the three abovementioned conduits 12, 13 and 14, are equipped with a valve for preventing or allowing flow of fluids there through; gas communication conduit valve 31, filter element inlet conduit valve 32 and filter element outlet conduit valve 33.

In the first embodiment, the method for the separation of liquid from a LTFT three phase slurry bubble column 1 includes the steps of applying a small filtering pressure differential across a hollow filter element 11 and any filter cake build-up thereon to obtain and withdraw a filtrate from inside the said filter element. The pressure differential is controlled by the slurry level 2 in the LTFT three phase slurry bubble column 1, and by keeping the gas communication conduit valve 31 on the gas communication conduit 14 between the upper part of the storage vessel 22 and the gas phase above the slurry level 2 in the LTFT slurry bubble column reactor 1 open. Filtrate is withdrawn from the filter element 11 to the filtrate storage vessel 22 through the filter element outlet conduit 13, and with the filter element outlet conduit valve 33 open. The filter element inlet conduit valve 32 is kept closed during the filtration step.

Figure 2:
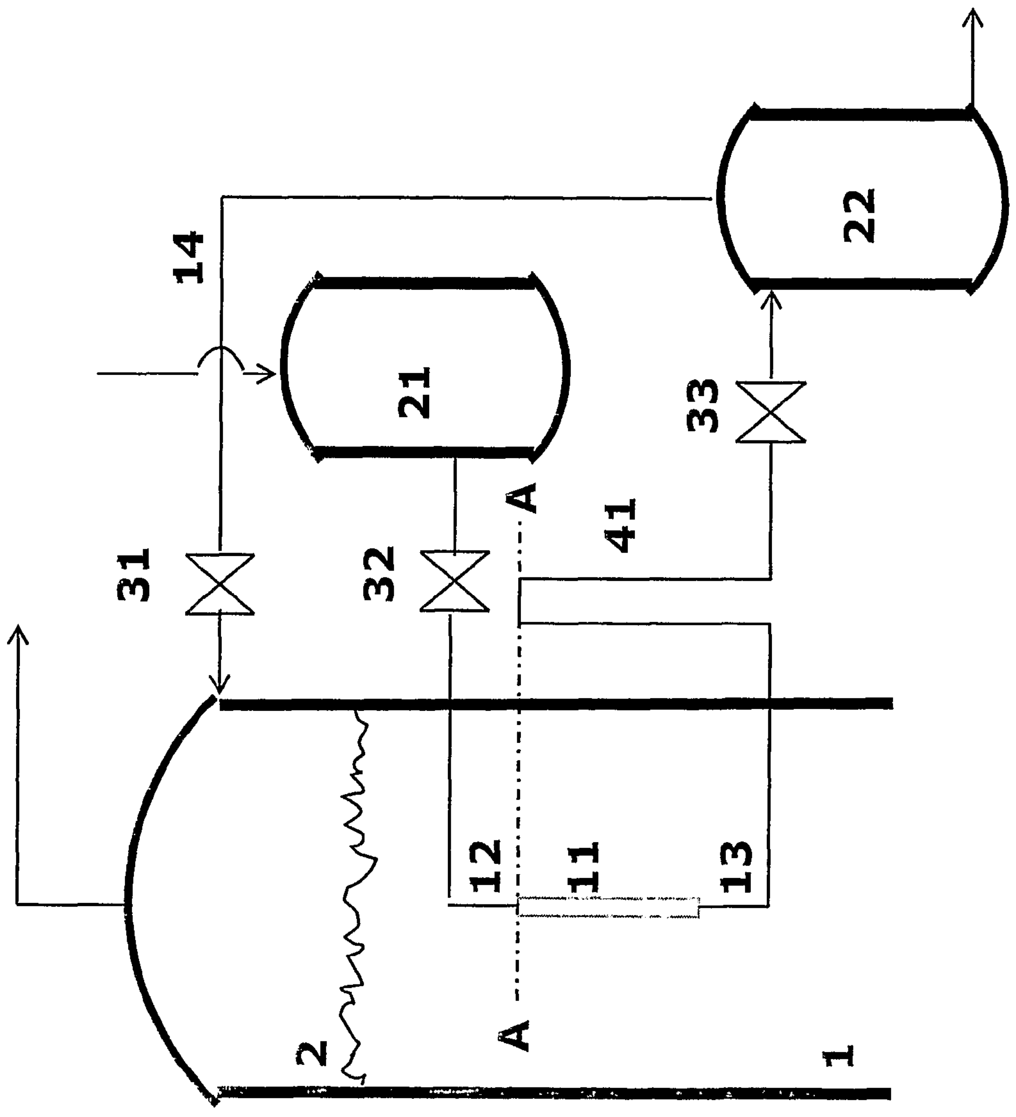
FIG. 2 and FIG. 3 show alternative arrangements of the conduit for outlet flow from the filter elements.

Optionally, the filter element outlet conduit 13 is equipped with a so-called "goose-neck" 41, illustrated in FIG. 2. The "goose-neck" 41 is a bend on the filter element outlet conduit 13. The vertical level of said bend has the same vertical level as the top of the filter element 11, as indicated by the vertical level line A-A on FIG. 2. The installation of this optional "goose-neck" 41, ensures that the inside of the filter element 11 is liquid filled during the filtration step.

Figure 3:
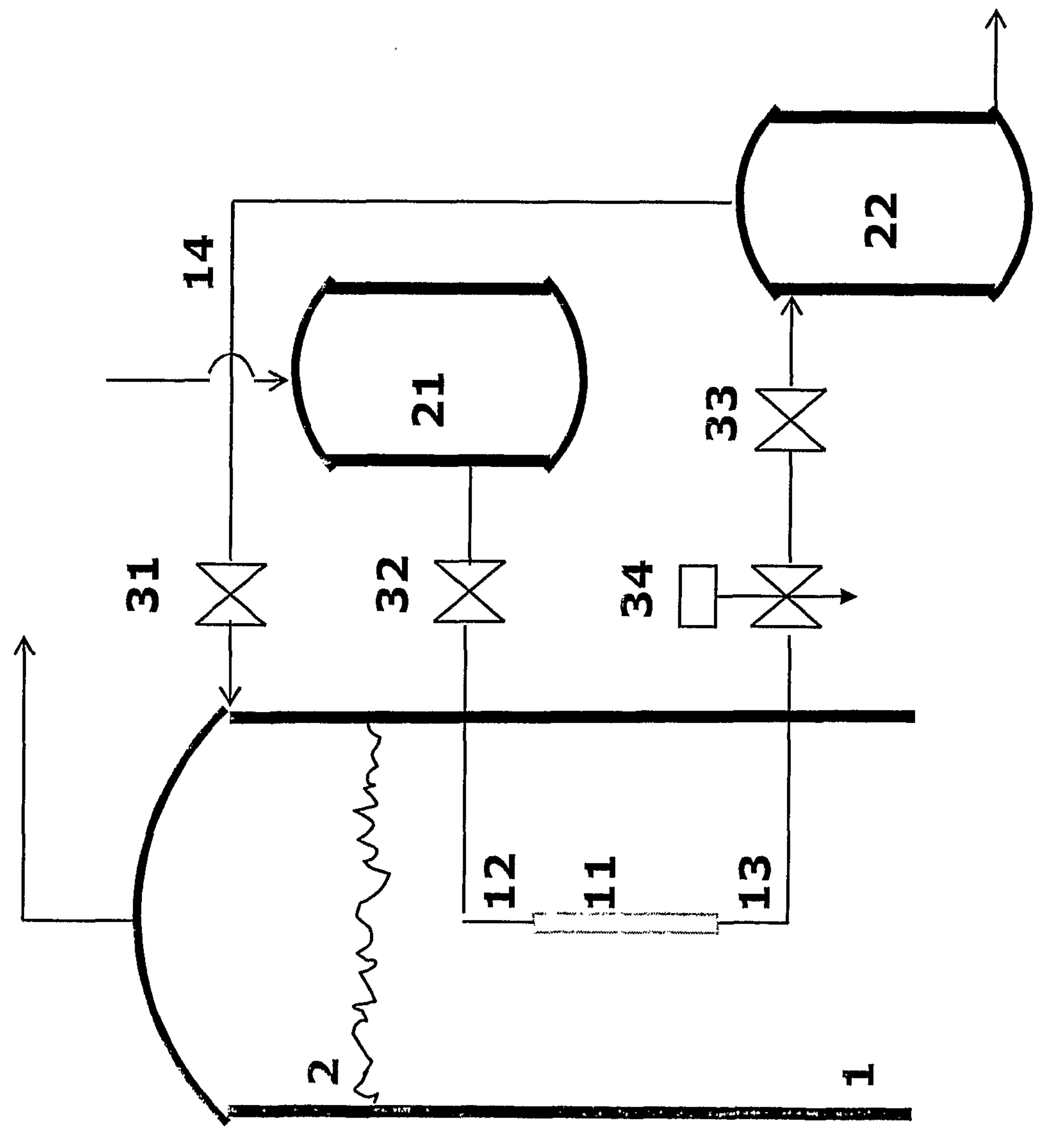

Optionally, the filter element outlet conduit 13 is equipped with a filter element outlet conduit flow controlling valve 34, illustrated in FIG. 3, thereby being able to control the filtrate flow rate, and also being able to keep the inside of the filter element 11 liquid filled during the filtration step if wanted.

Again referring to FIG. 1; the filtration step is followed by a rinsing step by opening the filter element inlet conduit valve 32. The inside of the filter element 11 is then charged with a rinsing fluid comprising condensed gaseous LTFT products from the rinsing fluid supply vessel 21 through the filter element inlet conduit 12. The charging pressure of the rinsing liquid should be lower or similar to the pressure at the outside of the filter element 11; in the slurry phase, to minimize transport of the rinsing fluid across the filter element into the slurry phase. (It should be obvious for any person skilled in the art that means for pressure control of the rinsing fluid supply vessel 21 are necessary even though this is not included in any of the illustrating figures.) The volume of the rinsing liquid should be selected to be similar or greater than the inside volume of the filter element 11. The rinsing fluid and any fines particles collected inside the filter element 11 is then removed from the filter element 11 through the filter element outlet conduit 13 to the storage vessel 22.

Depending of the charging pressure of the rinsing liquid and the pressure drop across the filter element 11 and the filter cake on the outside of said filter element, there may, or may not, be a transport of filtrate across the filter element 11 from the slurry phase during the rinsing step.

The rinsing step is followed by a backflushing step by closing the gas communication conduit valve 31, and the filter element outlet conduit valve 33.

In this first embodiment the backflushing fluid and the rinsing fluid are the same fluid; condensed gaseous LTFT products from the supply vessel 21 through the filter element inlet conduit 12.

The charging pressure of the backflushing fluid should be higher than the pressure at the outside of the filter element 11; in the slurry phase, to force transport of the said backflushing fluid across the filter element 11 to dislodge filter cake build-up. The backflushing liquid flux should be equal to or greater than twice the average liquid filtration flux.

After the completion of the backflushing step, the filter element inlet conduit valve 32 is closed, and the gas communication conduit valve 31, and the filter element outlet conduit valve 33 are opened, and normal filtration can resume with or without any waiting time.

Figure 4:
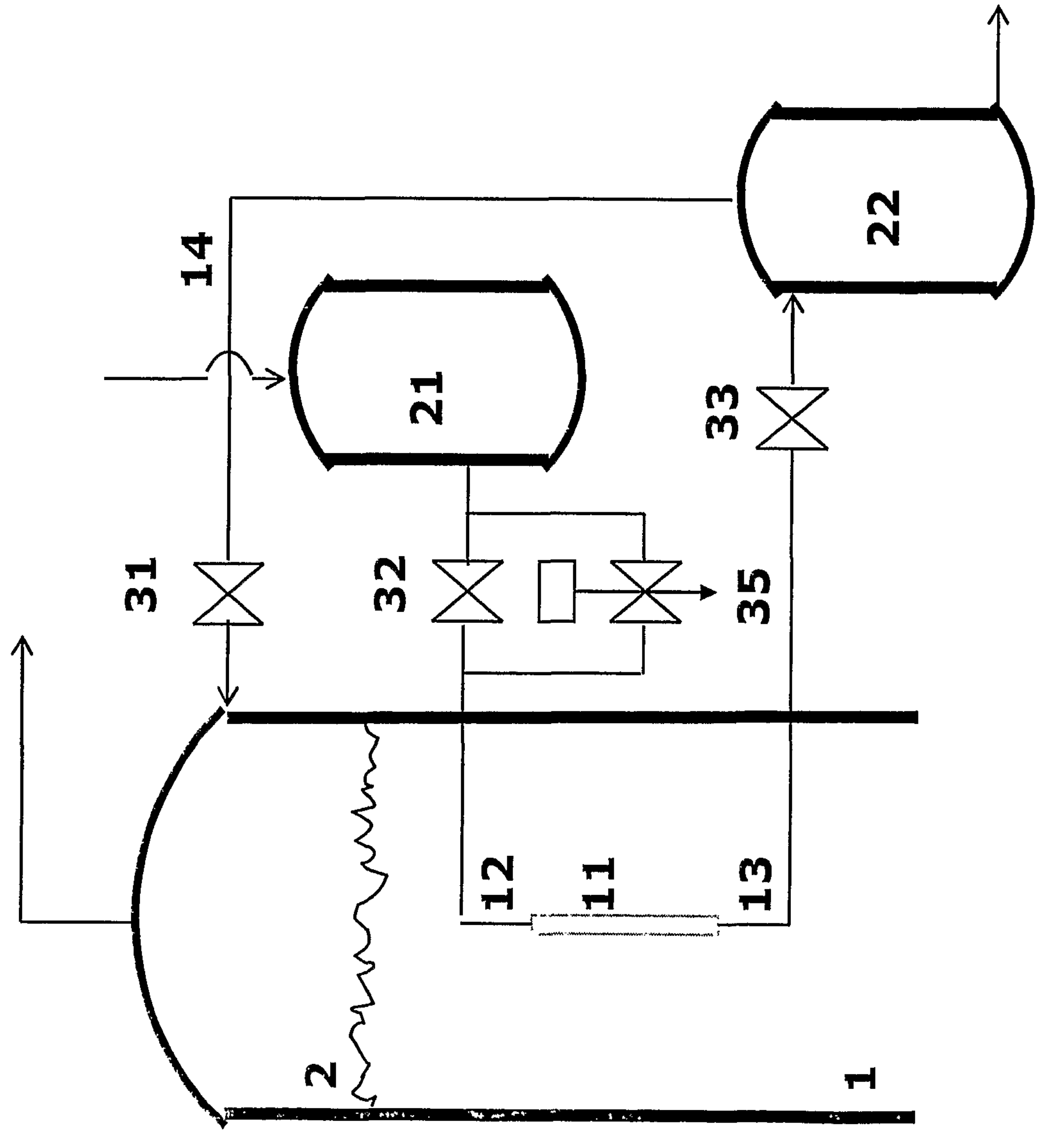
FIG. 4 shows an alternative arrangement with separate conduits for supplying rinsing liquid and backflushing liquid.

Optionally, the filter element inlet conduit 12 is equipped with two valves, as illustrated in FIG. 4; one to be open when charging rinsing liquid, and one when charging backflushing liquid. At the start of the rinsing step, the filter element inlet conduit valve 32 remains closed, while the rinsing liquid charging controlling valve 35 is opened, thereby being able to control the rinsing liquid flow rate. At the end of the filtration step, this rinsing liquid charging controlling valve 35 is closed, and the filter element inlet conduit valve 32 is opened, followed by a backflushing step as described above.

In a second embodiment, the rinsing step is not followed by a backflushing step, but with a second filtration step. This is done by closing the filter element inlet conduit valve 32 after the completion of the rinsing step, and a new filtration step can resume without any waiting time. The second filtration step is then followed by a second rinsing step by opening the filter element inlet conduit valve 32 as described for the rinsing step in the first embodiment. The second rinsing step can either be followed by a backflushing step by closing the gas communication conduit valve 31, and the filter element outlet conduit valve 33 as described in the first embodiment, or the second rinsing step can be followed by one ore more additional filtering and rinsing steps before the backflushing step. The volume of the rinsing liquid in each rinsing step should be selected to be similar or greater than the inside volume of the filter element 11.

Figure 5:
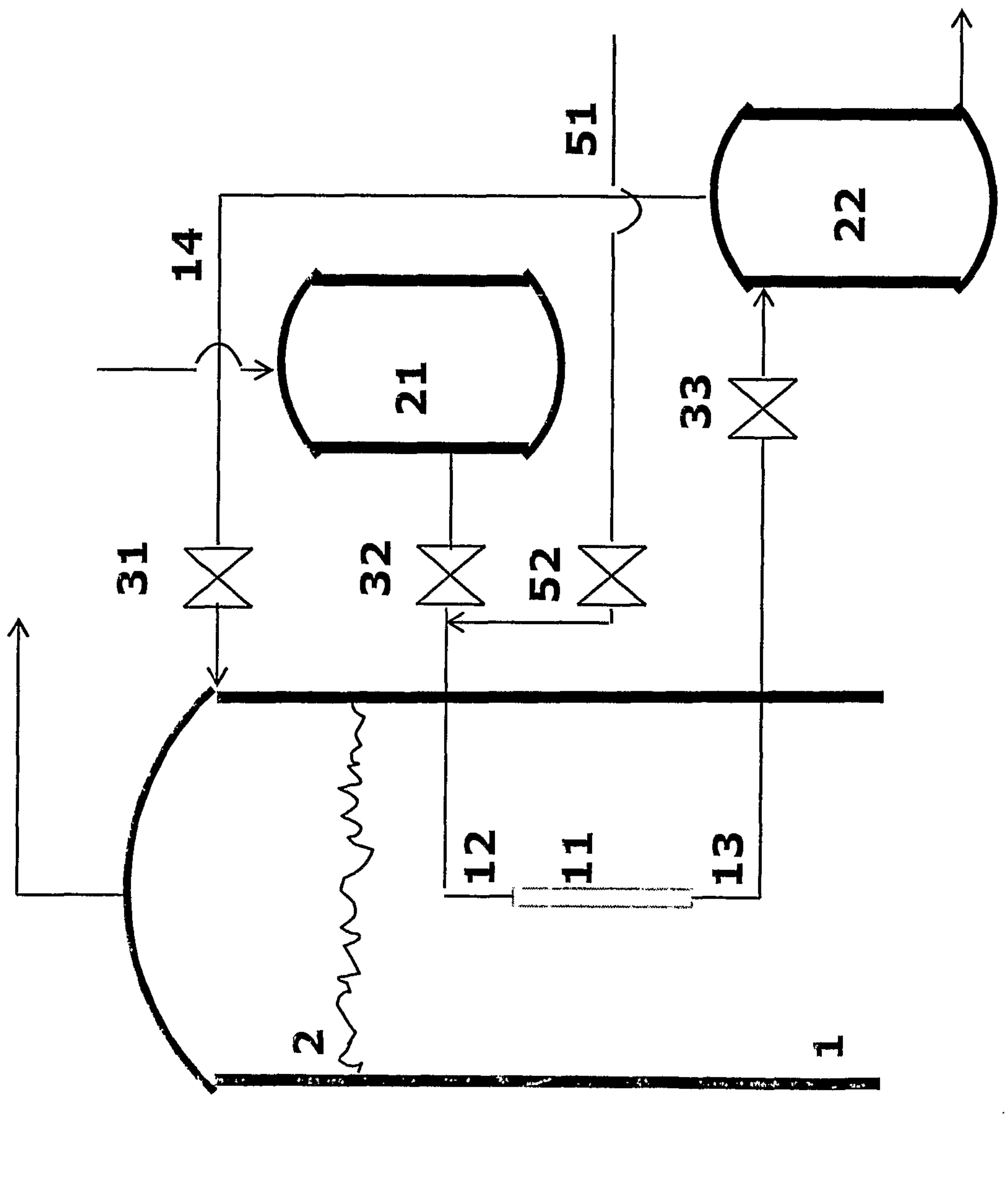
FIG. 5 shows an alternative installation where backflushing is gas assisted.

In a third embodiment, illustrated FIG. 5, the backflushing step is gas assisted. A gas backflushing conduit 51 is connected to the filter element inlet conduit 12. The gas backflushing conduit 51 is equipped with a gas backflushing conduit valve 52 for preventing or allowing flow of fluid there through.

In this embodiment the filtration step and the rinsing step are performed as in the first embodiment. During the filtration step and the rinsing step, the gas backflushing conduit valve 52 is kept closed.

The backflushing step involves closing the gas communication conduit valve 31, the filter element inlet conduit valve 32, the filter element outlet conduit valve 33, and opening the gas backflushing conduit valve 52.

The backflushing gas in the gas backflushing conduit 51 may be gaseous products from the Fischer-Tropsch reaction, synthesis gas, or an inert gas, such as nitrogen.

The pressure of the backflushing gas should be higher than the pressure at the outside of the filter element 11; in the slurry phase, to force transport of remaining rinsing liquid in the filter element 11 and the filter element inlet conduit 12 across the filter element 11 to dislodge filter cake build-up. The backflushing liquid flux should be equal to or greater than twice the average liquid filtration flux.

After the completion of the backflushing step, the gas backflushing conduit valve 52 is closed, and the gas communication conduit valve 31, and the filter element outlet conduit valve 33 are opened, and normal filtration can resume.

Figure 6:
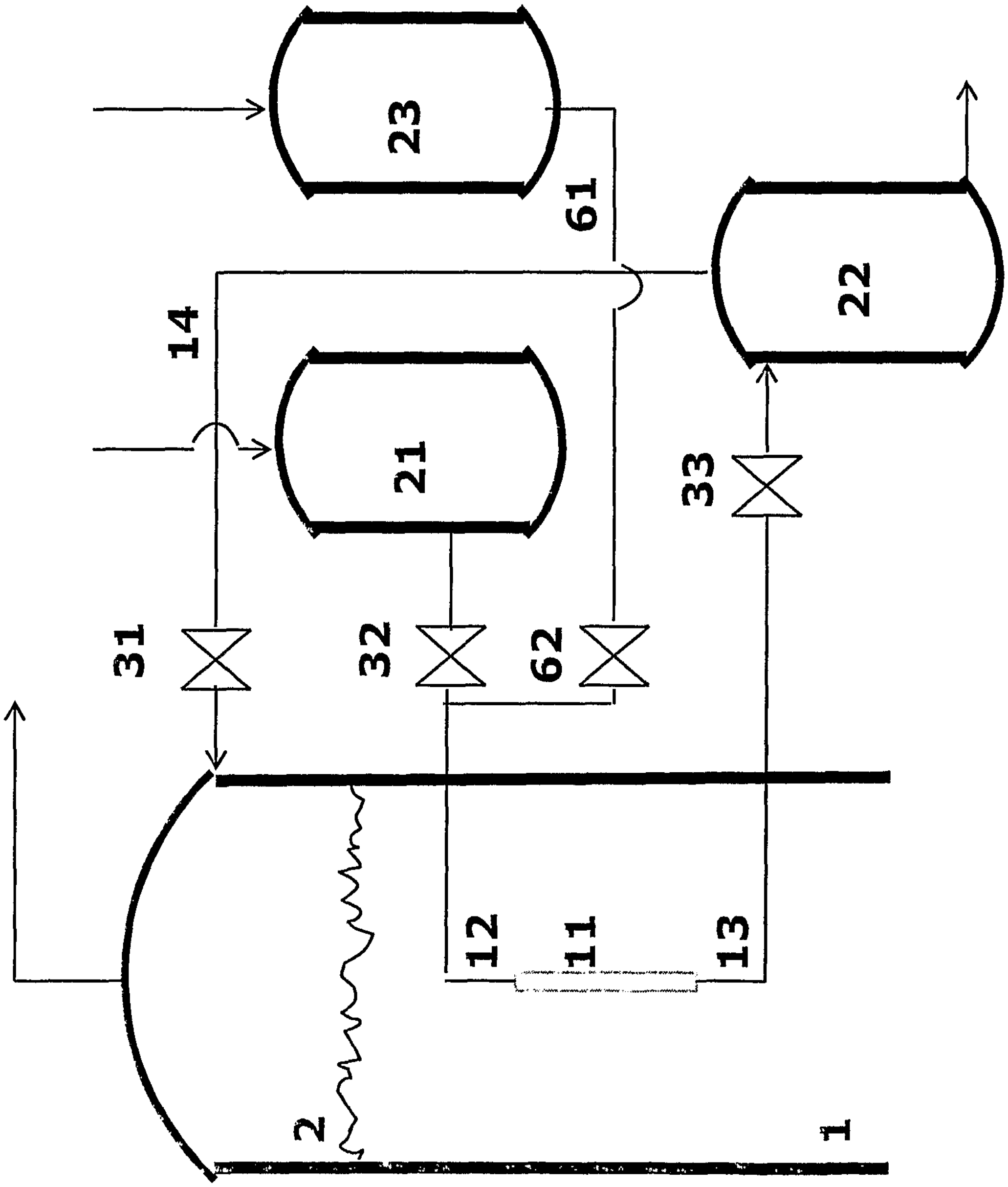
FIG. 6 shows an alternative installation with separate vessels for supplying rinsing fluid and backflushing fluid.

In a fourth embodiment, illustrated FIG. 6, separate vessels for supplying rinsing fluid and backflushing fluid are used. Vessel 21 is used for supplying rinsing fluid only, while a backflushing liquid supply vessel 23 is connected to the filter element inlet conduit 12 by a backflushing liquid conduit 61 between the filter element inlet conduit valve 32 and the filter element 11. The backflushing liquid conduit 61 is equipped with a backflushing liquid conduit valve 62 for preventing or allowing flow of fluid there through.

The filtration step and the rinsing step are performed as in the first embodiment. The rinsing fluid may be filtered liquid LTFT wax or another hydrocarbon liquid. During the filtration step and the rinsing step, the backflushing liquid conduit valve 62 is kept closed.

The backflushing step involves closing the gas communication conduit valve 31, the filter element inlet conduit valve 32, the filter element outlet conduit valve 33, and opening the backflushing conduit valve 62; applying a backflushing pressure higher than the pressure at the outside of the filter element 11; in the slurry phase, to force transport of the said backflushing fluid across the filter element 11 to dislodge filter cake build-up. The backflushing liquid flux should be equal to or greater than twice the average liquid filtration flux. The backflushing fluid may be condensed gaseous LTFT products or another hydrocarbon liquid from the supply vessel 23 through the backflushing liquid conduit 61.

Figure 7:
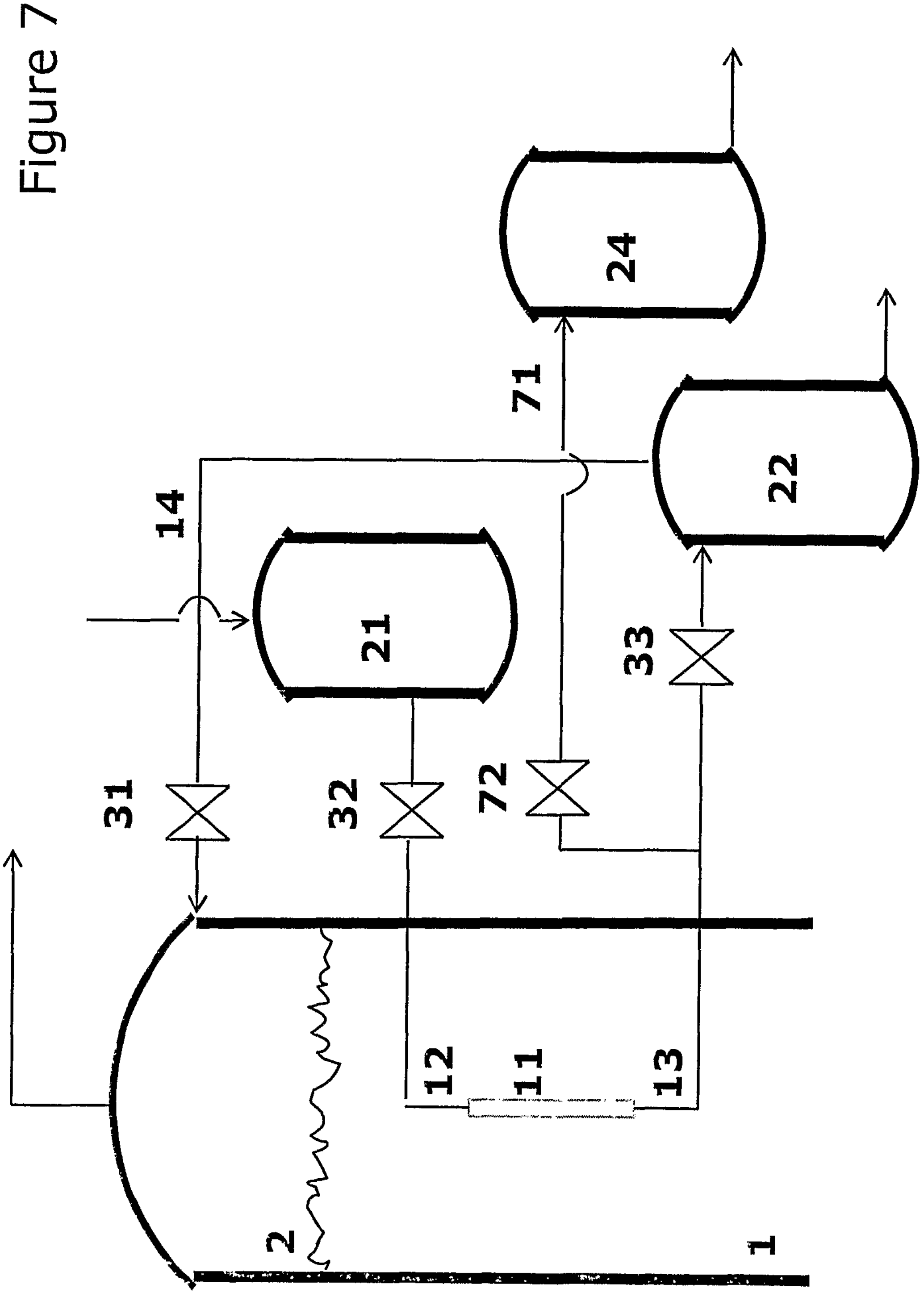
FIG. 7 shows an alternative installation with separate vessels for storage of filtrate and rinsing fluid.

After the completion of the backflushing step, the backflushing liquid conduit valve 62 is closed, and the gas communication conduit valve 31, and the filter element outlet conduit valve 33 are opened, and normal filtration can resume. In a fifth embodiment, illustrated FIG. 7, separate vessels for storing filtrate and rinsing fluid are used. Vessel 22 is used for storing filtrate only, while a rinsing liquid storage vessel 24 is connected to the filter element outlet conduit 13 by a rinsing liquid conduit 71 between the filter element outlet conduit valve 33 and the filter element 13. The rinsing liquid conduit 24 is equipped with a rinsing liquid conduit valve 72 for preventing or allowing flow of fluid there through. In this embodiment the filtration step is performed as in the first embodiment, and with the rinsing liquid conduit valve 72 closed.

This filtration step is followed by a rinsing step by closing the filter element outlet conduit valve 33, and opening the filter element inlet conduit valve 32 and the rinsing liquid conduit valve 72. The inside of the filter element 11 is then charged with a rinsing fluid comprising condensed gaseous LTFT products from the rinsing fluid supply vessel 21 through the filter element inlet conduit 12.

The charging pressure of the rinsing liquid should be lower or similar to the pressure at the outside of the filter element 11; in the slurry phase, to minimize transport of the rinsing fluid across the filter element into the slurry phase. The volume of the rinsing liquid should be selected to be similar or greater than the inside volume of the filter element 11. The rinsing fluid and any fines particles collected inside the filter element 11 is then removed from the filter element 11 through the rinsing liquid conduit 71 to the rinsing liquid storage vessel 24.

The rinsing step is followed by a backflushing step by closing the gas communication conduit valve 31, and the rinsing liquid conduit valve 72, applying a backflushing pressure higher than the pressure at the outside of the filter element 11; in the slurry phase, to force transport of the said backflushing fluid across the filter element 11 to dislodge filter cake build-up. In this embodiment the backflushing fluid and the rinsing fluid are the same fluid; condensed LTFT products from the supply vessel 21 through the filter element inlet conduit 12. The backflushing liquid flux should be equal to or greater than twice the average liquid filtration flux.

After the completion of the backflushing step, the filter element inlet conduit valve 32 is closed, and the gas communication conduit valve 31, and the filter element outlet conduit valve 33 are opened, and normal filtration can resume.

Figure 8:
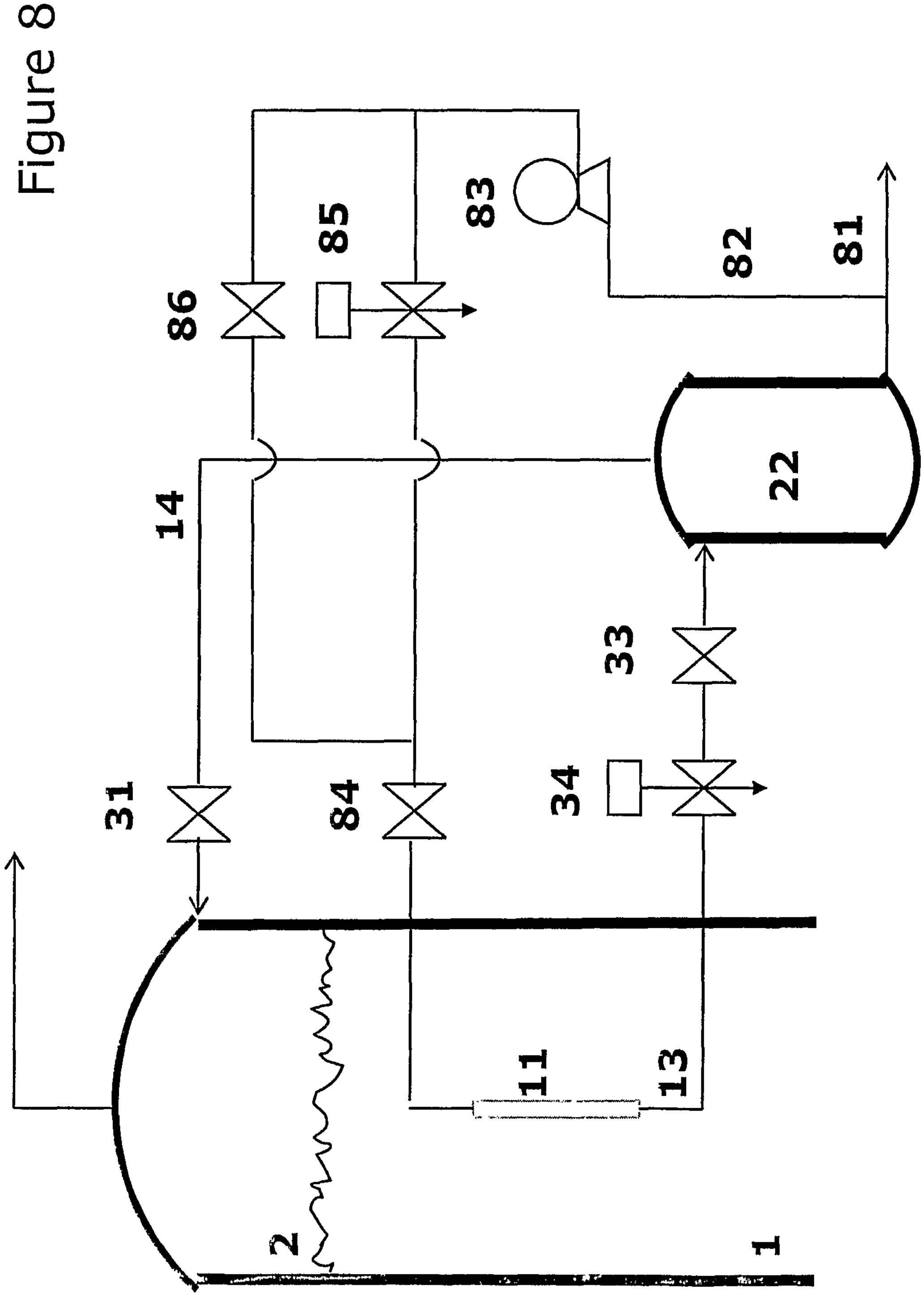
FIG. 8 shows an alternative installation where the filtrate is used as rinsing fluid and backflushing fluid.

In a sixth embodiment, illustrated FIG. 8 there is no separate vessels for supplying rinsing liquid, and backflushing liquid and for storing filtrate and rinsing liquid. Filtered liquid LTFT product wax is used both as rinsing liquid and backflushing liquid, and vessel 22 acts both as a supply for rinsing liquid and backflushing liquid and for storing filtrate. From the filtrate storage outlet 81, it is possible to recycle parts of the filtrate to the filter element 11 in a liquid recycle conduit 82 through a liquid recycle pump 83.

The liquid recycle conduit 82 is equipped with valves; a liquid recycle conduit valve 84 for preventing or allowing flow of fluids there through, a rinsing liquid controlling valve 85, and a backflushing valve 86.

This embodiment includes the steps of applying a small filtering pressure differential across a hollow filter element 11 and any filter cake build-up thereon to obtain and withdraw a filtrate from inside the filtering element. The pressure differential is controlled by the slurry level 2 in the LTFT three phase slurry bubble column 1, and by keeping the gas communication conduit valve 31 on the conduit 14 between the upper part of the storage vessel 22 and the gas phase above the slurry level 2 in the LTFT slurry bubble column reactor 1 open. Filtrate is withdrawn from the filter element 11 to the filtrate storage vessel 22 through the filter element outlet conduit 13, and with the filter element outlet conduit valve 33 open. The filter element outlet conduit 13 is equipped with a filter element outlet conduit flow controlling valve 34, for controlling the filtrate flow rate. The liquid recycle conduit valve 84 is kept closed during the filtration step.

This filtration step is then followed by a rinsing step by opening the liquid recycle valve 84, and the rinsing liquid controlling valve 85, charging the inside of the filter element 11 with filtered liquid LTFT product wax from vessel 22 through the liquid recycle conduit 82 and the liquid recycle pump 83 as a rinsing fluid. The backflushing valve 86 is kept closed during the rinsing step.

The charging pressure of the filtered liquid LTFT product wax should be lower or similar to the pressure at the outside of the filter element 11; in the slurry phase, to minimize transport of the filtered liquid LTFT product wax across the filter element into the slurry phase. The volume of the filtered liquid LTFT product wax in the rinsing step should be selected to be similar or greater than the inside volume of the filter element 11. The filtered liquid LTFT product wax and any fines particles collected inside the filter element 11 is then removed from the filter element 11 through the rinsing liquid conduit 33 to the rinsing liquid storage vessel 22.

The rinsing step is followed by a backflushing step by closing the gas communication conduit valve 31, the filter element outlet conduit valve 33, and opening the backflushing valve 86, and applying a backflushing pressure higher than the pressure at the outside of the filter element 11; in the slurry phase, to force transport of the filtered liquid LTFT product wax across the filter element 11 to dislodge filter cake build-up.

After the completion of the backflushing step, the liquid recycle conduit valve 84 and the backflushing valve 86 is closed, and the gas communication conduit valve 31, and the filter element outlet conduit valve 33 are opened, and normal filtration can resume.

Figure 9:
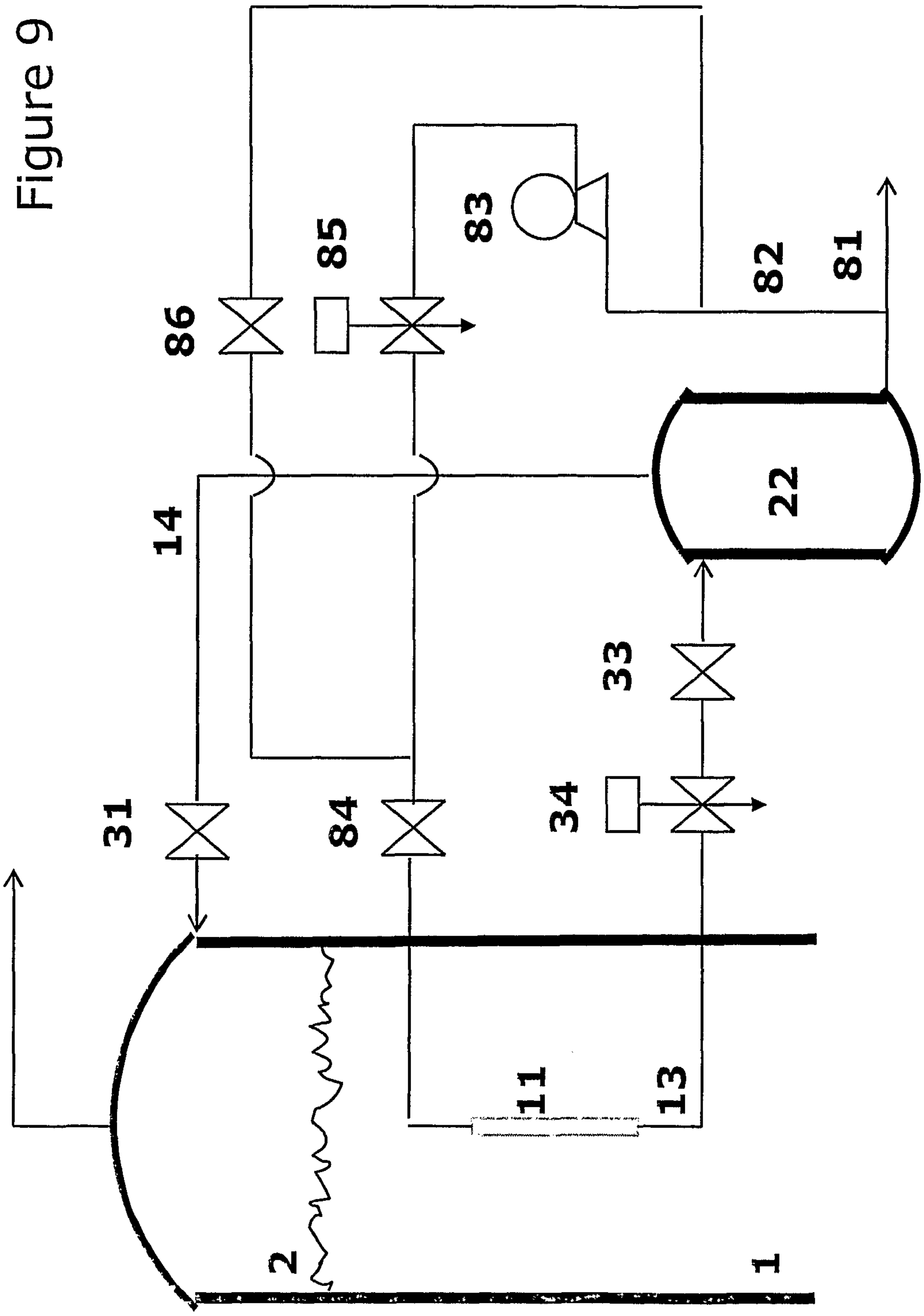
FIGS. 9 and 10 show alternative arrangements for recycling filtrate to be used as rinsing liquid and backflushing liquid.

Optionally the recycled liquid to be used as backflushing liquid can be routed outside the recycle pump 83 as illustrated in FIG. 9.

Figure 10:
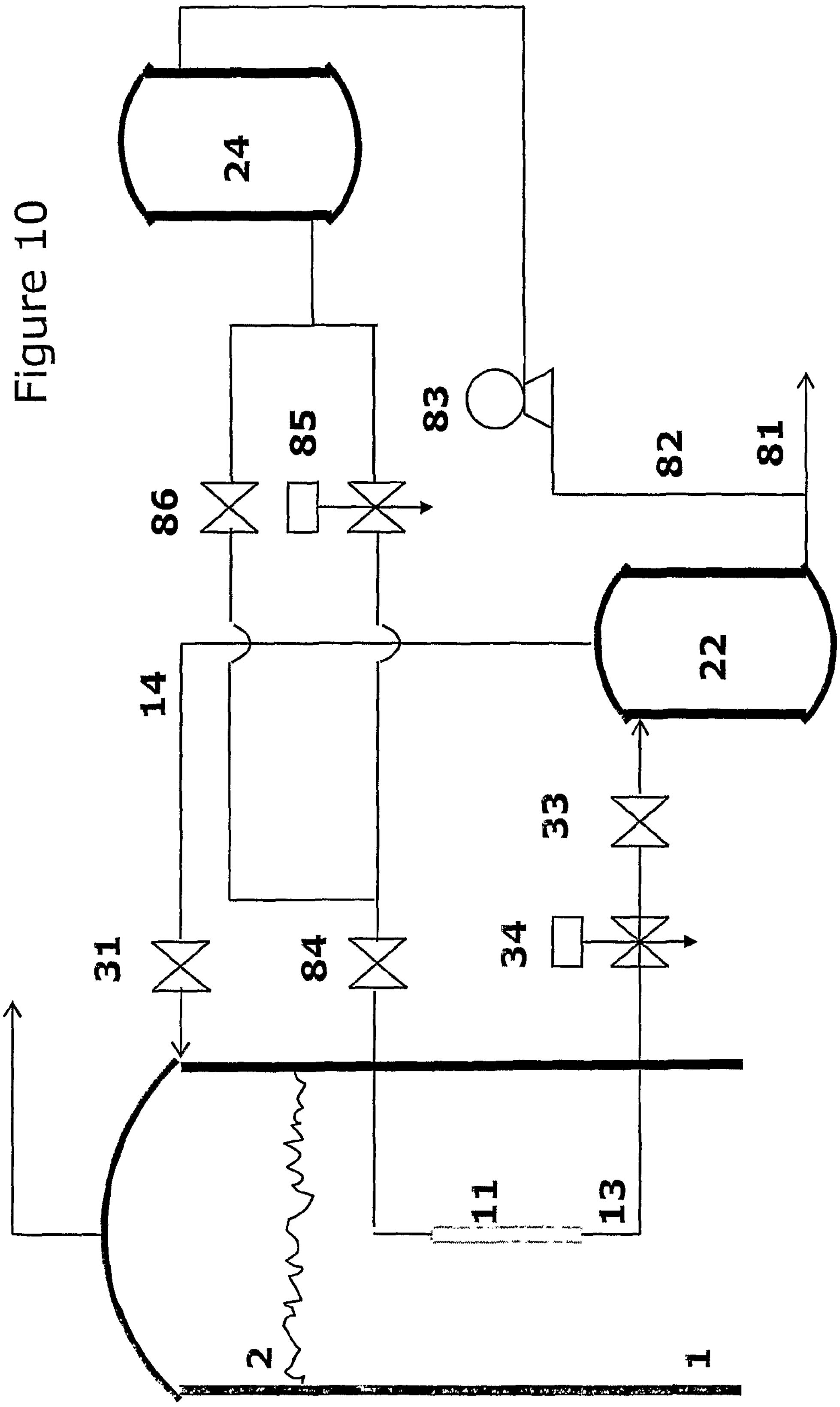

Optionally the recycled liquid can also be stored in a recycle liquid storage tank as illustrated in FIG. 10. Liquid recycled through the liquid recycle conduit 82 is pumped through the liquid recycle pump 83 to a liquid recycle storage tank 25, before the recycled liquid is used in the rinsing and backflushing steps as described above.

In a seventh embodiment, referring to FIG. 8, the filtration step and the rinsing step are run in parallel. During the filtration step, the liquid recycle valve 84 and the rinsing liquid controlling valve 85 are kept open, charging the inside of the filter element 11 with filtered liquid LTFT product wax from vessel 22 through the liquid recycle conduit 82 and the liquid recycle pump 83, in addition to filtrate transported across the filter element 11 from the slurry phase.

The charging pressure of the filtered liquid LTFT product wax should be lower than the pressure at the outside of the filter element 11; in the slurry phase, to avoid transport of the rinsing liquid across the filter element into the slurry phase. The combined filtration and rinsing step is followed by a backflushing step by closing the gas communication conduit valve 31, the filter element outlet conduit valve 33, and opening the backflushing valve 86, and applying a backflushing pressure higher than the pressure at the outside of the filter element 11; in the slurry phase, to force transport of the filtered liquid LTFT product wax across the filter element 11 to dislodge filter cake build-up.

After the completion of the backflushing step, the backflushing valve 86 is closed, and the gas communication conduit valve 31, and the filter element outlet conduit valve 33 are opened, the combined filtration and rinsing can resume.

It should be understood for any person skilled in the art that different combinations of the different embodiments described above are possible within the scope of the invention.

It should also be understood that the description, as well as the illustrating examples below, are provided to assist a person skilled in the art with understanding the invention, and are not meant to be construed as unduly limiting the reasonable scope of the invention.

The invention is now further described in the following examples:

EXAMPLE 1

In this first example a LTFT three phase slurry reactor with 2.7 m inner diameter and a height of 28 m, and with a filtration method according to the present invention installed in an embodiment as illustrated in FIG. 5 was used.

The installation included a plurality of hollow filter elements closed in both ends, immersed in a vertical orientation in the slurry. The filter elements were located in filter element groups. The filter media of the filter elements was manufactured from stainless steel woven wire mesh having an average pore size of 70 μm. The concentration of catalyst particles in the slurry in this experiment was 8 weight %, with a particle size distribution as given below:

<100 μm 95 vol %

<70 μm 50 vol %

<25 μm 10 vol %

<5 μm 3 vol %

The pressure of the LTFT slurry reactor was 1600 kPag.

During the filtration step a filtering pressure differential of 0.01-100 kPa across the filter elements and the filter cakes built up on the outside of the filter elements was applied to obtain and withdraw a filtrate from the inside of the filter elements. For one group of filter elements, the filtration step was followed by a rinsing step by charging the inside of the filter elements in this group of filter elements with a rinsing liquid comprising condensed LTFT products. The rinsing liquid flow rate was controlled by the differential pressure between the LTFT reactor and the vessel for supplying rinsing liquid and backflushing liquid.

The rinsing step was followed by a backflushing step by applying a backflushing pressure differential of 500 kPa between the LTFT reactor and the vessel for supplying rinsing liquid and backflushing liquid, to force the backflushing liquid comprising condensed LTFT products in the opposite direction across the filter media to dislodge the filter cakes. The backflushing liquid was allowed to flow into the filter elements for 1 to 5 seconds. Thereafter a flow of inert gas was used as an additional backflush pulse through the filter elements for 0.5 to 10 seconds After the backflushing step, a new filtration step was started.

The procedure described above was then repeated for each group of filter elements.

EXAMPLE 2

In this example a LTFT three phase slurry reactor, with 55 mm inner diameter and a height of 5 m and with a filtration method according to the present invention installed in an embodiment as illustrated in FIG. 9 was used. The installation included one single hollow filter element closed in both ends, immersed in a vertical orientation in the slurry. The filter media of the filter element was manufactured from stainless steel woven wire mesh having an average pore size of 70 μm. The concentration of catalyst particles in the slurry in this experiment was 12 weight %, with a particle size distribution as given below:

<100 μm 95 vol %

<70 μm 50 vol %

<25 μm 10 vol %

<5 μm 3 vol %

The pressure of the LTFT slurry reactor was 2000 kPag.

During the filtration step a filtering pressure differential of 0.01-30 kPa across the filter element and the filter cake built up on the outside of the filter element was applied to obtain and withdraw a filtrate from the inside of the filter element. The filtration step was followed by a rinsing step by charging the inside of the filter element with a rinsing liquid comprising recycled filtered liquid LTFT wax. The recycled filtered liquid LTFT wax was degassed in a storage vessel before recycling. The rinsing liquid flow rate was controlled by a control valve on the conduit before the filter element. The flow rate used was in the range 10-50% of the filtration rate, and was applied for 5 to 60 seconds.

The rinsing step was followed by a backflushing step by applying a backflushing pressure differential of 80 kPa between the LTFT reactor and the storage vessel, by pressurizing the storage vessel, to force a backflush of the recycled filtered liquid LTFT wax in the opposite direction across the filter media to dislodge the filter cake. The backflushing flow rate was at least twice the filtration flow rate; typically in the order of 10.000-20.0000 kg/m$^2$h.

The backflushing liquid was allowed to flow into the filter element for 3 to 20 seconds. Thereafter the pressure in the storage vessel and the LTFT reactor was equalized, and a new filtration step could start.

Figure 11:
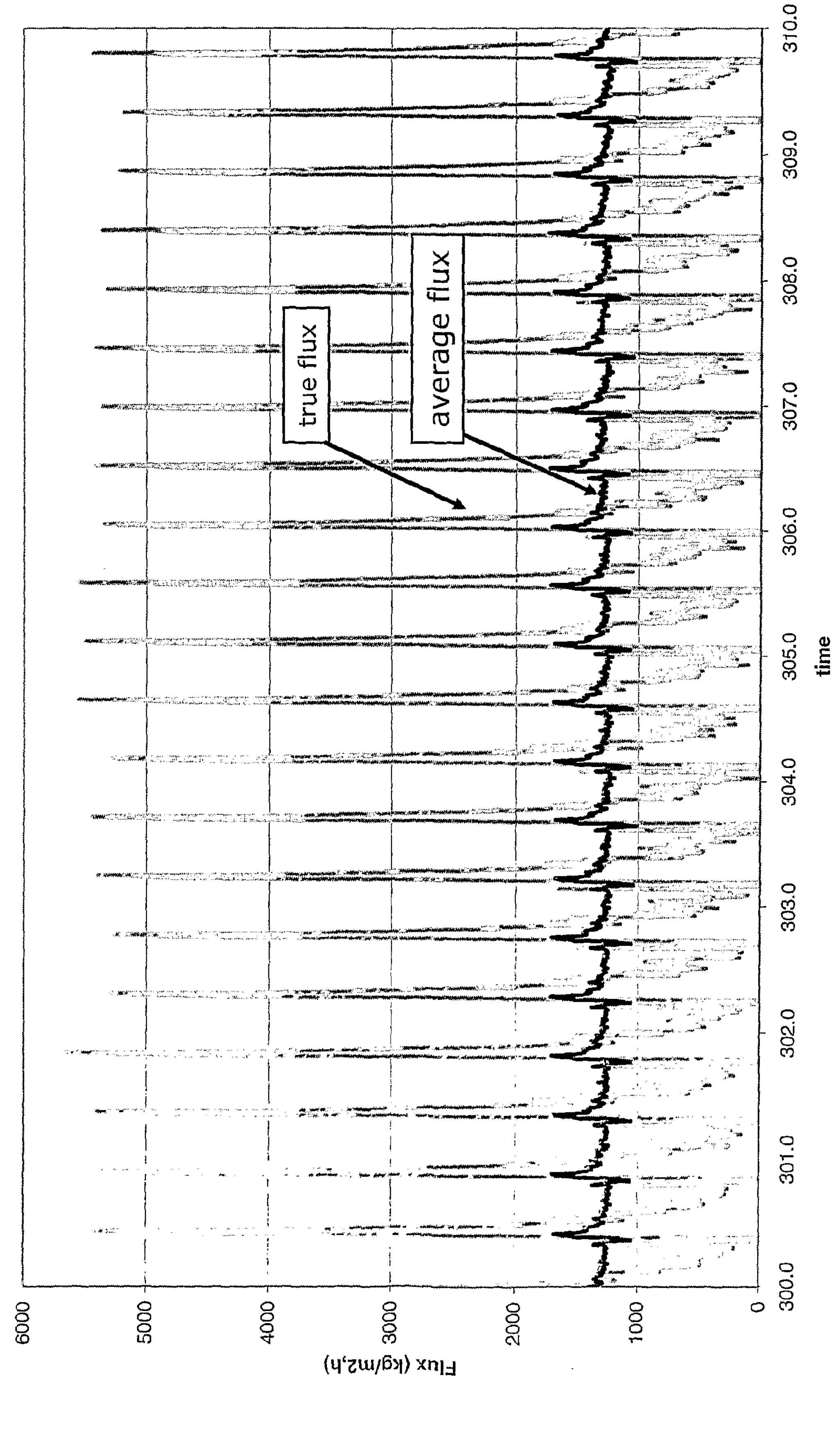
FIG. 11 shows filtration flux rates from an experiment in a LTFT reactor.

In FIG. 11 flux rates (in kg/m$^2$h) from 20 cycles of filtration, rinsing and backflushing in this experiment are given. In FIG. 11 two curves are shown. One curve shows the true flux, while the other shows the average flux over a 30 minutes period. The curve showing the true flux shows that the true flux within each cycle is very high immediately after the backflushing step, and that the true flux is gradually decreasing throughout the filtration sequence. The curve showing the average flux over 30 minutes shows that the average flux within each filtration sequence is constant, indicating no apparent loss of filtration capacity by time.

The invention claimed is:

1. A method for the separation of liquid from a three phase slurry bubble column, comprising the steps of:

a) applying a filtering pressure differential across a filtering media of a hollow and enclosed filter element and any filter cake build-up on an outside of said hollow filter element, to obtain and withdraw a filtrate from inside the hollow filter element, wherein there is no direct liquid communication between the inside of the hollow and enclosed element and the outside of the hollow and enclosed filter element except for passage of fluids through the filtering media;

b) in parallel or followed by; charging, through at least one conduit configured for inflow of a rinsing fluid, the inside of the hollow and enclosed filter element with the rinsing fluid to clean the inside of the hollow and enclosed filter element of catalyst fines, wherein a charging pressure of the rinsing fluid when charging the inside of the hollow and enclosed filter element is equal to or lower than a pressure on the outside of the hollow filter element, in a slurry phase; thereafter c) removing the rinsing liquid together with any fines suspended therein from the inside of the hollow and enclosed filter element via a conduit configured for outflow of the rinsing fluid from an internal volume of the hollow and enclosed filter element; and thereafter d) applying a backwashing pressure differential opposite to the filtering pressure differential to force a backflushing fluid in an opposite direction across the hollow filtering media to dislodge filter cake build-up.

2. The method of claim 1, wherein one or more of the steps are repeating steps.

3. The method of claim 1, wherein the inside of the filter element is charged with rinsing fluid when a filtration rate has reached a predetermined low level, or after a predetermined time.

4. The method of claim 1, wherein the step of applying a backwashing pressure follows the step of charging the inside of the hollow and enclosed filter element with a rinsing fluid after a predetermined time.

5. The method of claim 1, wherein the rinsing fluid comprises a hydrocarbon liquid essentially free from fines particles.

6. The method of claim 5, wherein the rinsing fluid comprises at least one liquid Fischer-Tropsch reaction product.

7. The method of claim 1, wherein a volume of the rinsing liquid is selected to be similar to or greater than an inside volume of the hollow and enclosed filter element.

8. The method of claim 1, wherein the hollow and enclosed filter element is charged in a turbulent manner to increase suspension of fines in the rinsing fluid.

9. The method of claim 1, further comprising a step of directing rinsing liquid together with any fines suspended therein to a rinsing liquid vessel for further processing.

10. The method of claim 1, wherein the step of charging the inside of the hollow and enclosed filter element with a rinsing fluid is repeated one or more times before the backwashing step.

11. The method of claim 1, wherein a temperature of the rinsing fluid and a temperature of the backwashing fluid are such that condensation of water in a slurry phase in a vicinity of the hollow and enclosed filter element is avoided.

12. The method of claim 1, wherein the rinsing fluid is a liquid selected from the group consisting of a hydrocarbon liquid, a filtered liquid wax, and a condensed gaseous product.

13. The method of claim 1, wherein the backflushing fluid is the same as the rinsing fluid.

14. The method of claim 1, wherein the backflushing fluid is different from the rinsing fluid.

15. The method of claim 1, wherein the filtrate is a low temperature Fischer-Tropsch product.

16. The method of claim 1, wherein the filtrate is a low temperature Fischer-Tropsch wax.

17. The method of claim 1, wherein the rinsing fluid is a filtered liquid low temperature Fischer-Tropsch wax.

18. The method of claim 1, wherein the backflushing fluid is a filtered liquid low temperature Fischer-Tropsch wax.

19. The method of claim 1, wherein the filter element is a surface filter closed in both ends, and wherein a filter element mesh size is in a same order as an average particle size of the catalyst fines in the slurry phase.

20. The method of claim 9, wherein a gas communication conduit is provided between an upper part of the rinsing liquid vessel and a gas phase above a slurry level in the three phase slurry bubble column to ensure gas communication between the rinsing liquid vessel and the three phase slurry bubble column.

21. The method of claim 1, wherein the step of applying a filtering pressure differential results in catalyst fines being trapped in openings of the filtering media or collected on an inside of the filtering media.

* * * * *